(No Model.)
I. N. LEWIS.
ELECTRIC SWITCH.
No. 516,498. Patented Mar. 13, 1894.
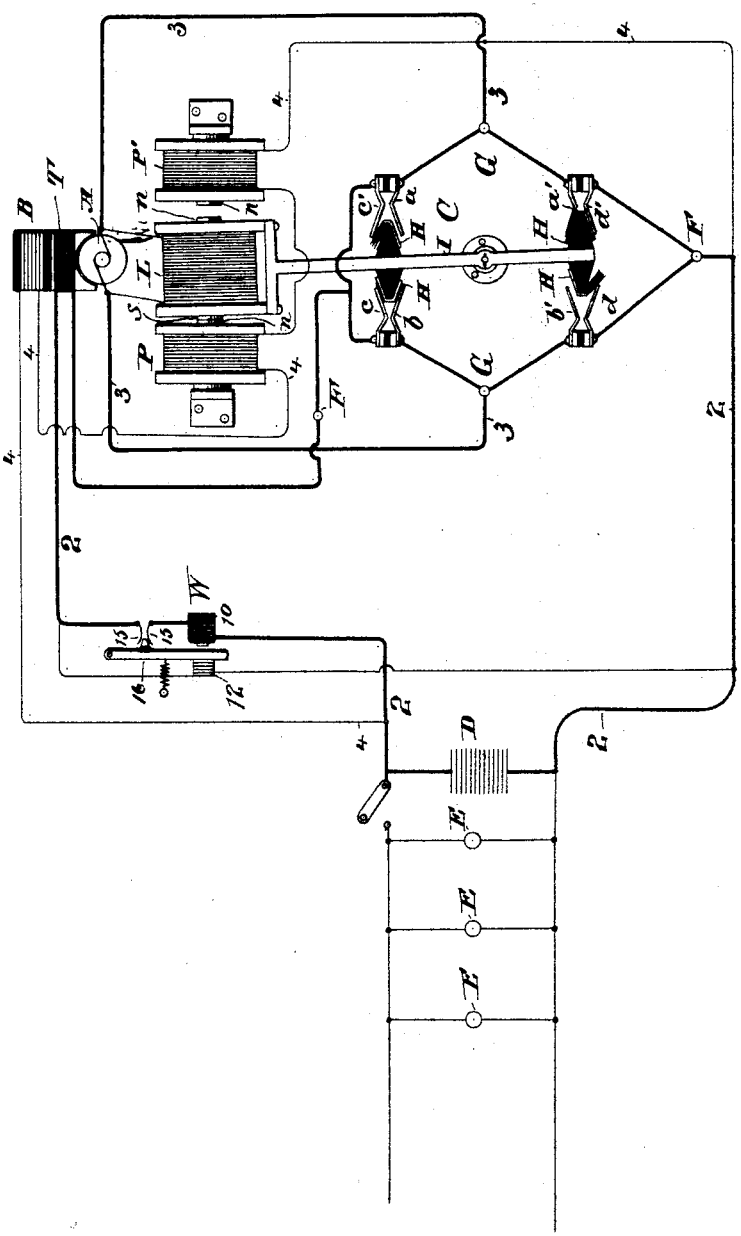
WITNESSES:
INVENTOR
Isaac N. Lewis.
BY
ATTORNEY

UNITED STATES PATENT OFFICE.

ISAAC N. LEWIS, OF FORT WADSWORTH, ASSIGNOR TO THE LEWIS ELECTRIC COMPANY, OF NEW YORK, N. Y.

ELECTRIC SWITCH.

SPECIFICATION forming part of Letters Patent No. 516,498, dated March 13, 1894.

Application filed October 12, 1893. Serial No. 487,924. (No model.)

*To all whom it may concern:*

Be it known that I, ISAAC N. LEWIS, a citizen of the United States, and a resident of Fort Wadsworth, in the county of Richmond and State of New York, have invented a certain new and useful Electric Switch, of which the following is a specification.

My invention relates to an automatic switch designed for use with a dynamo electric machine or other source of electricity.

The object of the invention is to secure from said source a current of invariable polarity or direction upon the exterior or working circuit irrespective of the manner in which the said source may be connected to said circuit, the direction in which the armature of the machine (when the source is a dynamo machine) may turn, or the particular way in which the temporary or changeable connections of the field or other portion determining the polarity of the current, may be made.

While my invention finds its chief field of usefulness in connection with dynamo machines whose armatures are subject to reversals of direction in turning, it is also in some respects applicable to other sources of electricity and in such case provides a safeguard against mistake in coupling the source to the working circuit wherever it is necessary that the current should flow on such circuit in a particular direction.

My invention is very useful in cases where the working circuit contains a storage battery the dynamo of which is driven from a car axle or other reversible driving power as, for instance, in the manner described in my prior Patent No. 504,681, dated September 5, 1893.

My invention consists in the combination with a dynamo machine having a regulating coil which cuts down the field upon increase of speed, of a pole changer between said coil and the armature, and a polarized controlling magnet or armature for said pole changer responsive to reversals in the direction of armature rotation.

My invention consists further in the combination with a dynamo separately excited from any source as soon as the armature begins to rotate, of a storage battery charged thereby, an electro-magnetic switch controlling the connection of the armature and battery, and responsive to the changes of voltage of the dynamo, and an electro-magnetic pole changing switch between the battery and armature, responsive to change in the direction of armature current.

My invention consists further in the special combinations of apparatus, as hereinafter more fully described and specified in the claims.

In the accompanying drawings I have illustrated my invention diagrammatically the switch apparatus being shown in plan and the source which is indicated as a dynamo in side elevation.

A, indicates the dynamo armature; B, the field magnet and C, a form of pole changer or current reverser which is interposed between the source A, and a working or exterior circuit indicated by the heavy black line 2.

D, is a storage battery charged over said circuit from the source A, and E, electric lamps or other translating devices operated from the source A, or from the source D, when the former source fails to supply the required voltage, as well understood in the art, the source D, furnishing in the present case a reserve source. It is to be understood, however, that the main features of my invention apply also to cases where the circuit 2, is used as a circuit for charging the storage battery only.

F, F, indicate terminals of the current reversing or pole changing device to which the working circuit 2, may be connected.

The connections from the dynamo armature A, or other source to the pole changer, are indicated by the numeral 3. The pole changer or current reverser itself may be of any desired construction, but I prefer to construct it as herein illustrated, since I am thereby enabled to avoid carrying the circuit through bearings of the apparatus.

The positive and negative terminals of the source A, are connected by wires 3, to the poles G, G, of the pole changer, as shown. The poles or terminals G, are connected respectively with pairs of springs $a, a', b, b'$.

The poles or terminals F, F, connect respectively with pairs of springs $c, c', d, d'$.

In one position of the pole changer or reverser spring $a'$, is connected to spring $d'$, and spring $b$, to spring $c$. In the other position spring $a$, is connected to spring $c'$, and spring $b'$, to spring $d$. The connection is made by means of contacts H, mounted as shown on lever I, and insulated from one another. Each contact H, consists preferably of a number of metal laminæ secured to a stud projecting from lever I, and adapted to enter the space between two of the springs for the purpose of completing the connection between them.

In the position of pole changer shown, the current will flow from one terminal of armature A, by means of springs $b$ and $c$, to the exterior working circuit and return by way of springs $d'$ and $a'$, back to the other terminal of the machine. In the other position of the switch the current will flow from the opposite terminal of the machine by way of springs $a$, $c'$, to the same pole of the exterior circuit and back to the other terminal by way of springs $d, b'$. Hence as will be seen, should the polarity of the current delivered from armature A, change, and the pole changer be at the same time reversed, the current will always flow in the same direction over the exterior or working circuit. This change in the direction of the flow of current from the armature A, over the exterior or working circuit will occur, obviously, if the direction of rotation of the armature be changed through reversal of its driving power as, for instance, in the case of an armature driven from a car axle.

The pole changer is governed or operated by a polarized electro-magnetic controller which may consist of an electro-magnetic device of any desired description constructed to respond to reversals of current, as well understood by electricians. A convenient and powerful form of device for this purpose is illustrated in the drawings and consists of an electro-magnet L, mounted upon and firmly secured to the lever I, and adapted to play between two other electro-magnets P, P', the poles of the several magnets being presented to one another, as shown, and the magnetic polarities of magnets P and P', being so adjusted that their poles presented to the poles of magnet L, will be of the same sign thereby causing repulsion on one side and attraction on the other side of the magnet L. The polarities existing and effective in throwing the pole changer or reverser into the position shown and holding it in such position, are indicated by the letters $n, s$.

The constant or uniform polarization of the apparatus which causes the reversal of movement under the reversal of current flow, may be maintained by supplying current to the coils P, P', from any desired source which will supply current always in the same direction.

For convenience and also for the purpose of making the device effective under certain conditions, I prefer to supply the coils P, P', from the exterior or working circuit 2, as indicated by the finer line 4. This same circuit 4, may include also the coil which energizes the field magnet B, of the machine. This is, however, a matter simply of convenience as the field might be fed from any suitable source which will insure its having always the same polarity when the machine starts into operation.

To render the device responsive to changes in the direction of current delivered from armature A, I simply connect the coils of the magnet L, to the terminals of said armature in any suitable manner. By preference I connect them in a branch across said terminals independent of the circuit 3, but do not confine myself to such special connection, the only requisite being that the device should respond to the reversal in the polarity of the currents supplied from A, as, for instance, when its direction of rotation is reversed.

Assuming that the source A, is one the polarity of which is always the same, it will be obvious that a useful purpose is subserved by charging the magnets P, P', from the circuit 2. Thus, for instance, if in connecting the circuit 2, to the terminals F, F, the connections should be reversed, the direction of current flow on the circuit 2, from the source A, will be immediately rectified by reason of the fact that the magnetic polarity of magnets P, P', will change. As the magnet L, which is connected directly to the source retains its polarity, the current reverser will be shifted over thus causing the current to flow in proper direction over the circuit 2. The normal operation, however, in the case of the application of the device to a dynamo armature A, which is subject to change in its direction of rotation, requires that the polarity of magnets P, P', should be constant. This constancy is obtained by the connection of said coils to the circuit 2, where they will be fed with current from the storage battery D, when the armature is out of action or when its potential is not of the proper amount, as will be presently described, to cause it to be connected to the circuit 2.

The dynamo machine is provided with a regulating coil T, which is a main circuit coil, and instead of being connected in a manner to tend to raise the strength of the field is applied so as to tend to cut down the field developed by coil B, thereby preventing undue increase of voltage from extreme increase of speed of the armature A. The proportioning of the effects of coils B and T, is preferably such that when the armature reaches a critical speed, the further increase of current in coil T, will tend to diminish the field magnetism thereby keeping down the voltage to the proper or required amount. Up to the attainment of such critical speed the action of the coil T, is not sufficient to prevent the voltage from rising to that required for charging the battery. This action may be assisted by giving to the coil B, a super-exciting effect more than sufficient to saturate the field magnet and by adjusting the action of the coil T, so that, when the critical speed has been attained, the current flowing in coil T, will be sufficient to balance the super-exciting effect or capacity of coil B, after which any further increase of current will tend to cut down the field magnetism. This combination of coils I do not claim herein as it forms the subject of claims in another application for patent filed by me September 6, 1893, Serial No. 484,898.

For the purpose of connecting the dynamo to a storage battery when the voltage of the dynamo has risen to that proper for charging the battery and disconnecting it when its voltage falls below the proper amount, I make use of any suitable electro-magnetic switch controlling the connection of the armature and battery and responsive to changes of voltage of the dynamo. By preference I employ such a switch as is described in a prior application for patent filed by me September 6, 1893, Serial No. 484,897, but do not wish to be understood as limiting myself to such special device.

By employing an electro-magnetic switch for controlling the connection of the dynamo and battery according to the voltage and by using an electro-magnetic pole changing switch, as already described, responsive to changes in the direction of the current supplied by the armature arising from changes or reversals in its direction of rotation, I provide an exceedingly effective and simple combination of devices adapted for use with dynamos driven from car axles and supplying storage batteries and by such combination dispense entirely with the use of mechanical rotating devices analogous to steam engine governors and adjusted to operate at critical speeds as heretofore proposed in the art of train lighting.

The switch for controlling the connection of the dynamo and battery is indicated at W. It has a main circuit coil in the connection 2, and a polarizing coil 12, connected across the working circuit as shown. The connection between the armature and the battery is formed by completing the working circuit 2, across a pair of springs 15, 15, adapted to be bridged by a contact carried by the lever 16, of the switch. Lever 16, is the armature for the magnet 10, and is polarized by the coil 12. When the armature starts into rotation the coil 10, is out of circuit but the coil 12, is in the circuit from one pole of the armature to the other so that as the machine builds up, the coil 12, will polarize the armature and the attraction between the armature and the core of 10, will cause the switch to operate and close the main circuit. This operation will obviously take place at a critical point in the rise of voltage, said point being determined by the adjustment of a suitable retractor and being, of course, that at which the voltage is proper for charging the battery. When the switch operates the magnet 10, is charged but with such polarity that the switch will be held by the attraction of the poles of 10, and 12. Should the current reverse in 10, through the fall of voltage in the dynamo and the discharge of the battery back through the switch, then there will be an actual repulsion between 10 and 12, where formerly there was attraction and the switch will be forcibly thrown open.

While I have shown my invention as applied to a dynamo having the self-regulating feature described in my prior application, I do not wish to be understood as limiting myself to the use of such form of dynamo in connection with the other devices.

The general operation of the apparatus will be as follows:—When the machine is at rest the main circuit or circuit supplied from the armature is open at the switch 15; the pole changer C, stands in either of its two extreme positions, or in an intermediate position, the magnets P, P', are charged over the circuit 4 from the battery D. When the machine starts into operation the current from its armature flows through the coil 12, and also flows through the coil of electro-magnet L. The direction of its flow through the coil 12, will obviously depend upon the position of the switch C, and upon the direction in which the armature rotates, while the direction of its flow in coil L, will depend simply upon the direction of rotation of the armature. The adjustment of the parts is such that the polarized electro-magnetic controller for the current reverser will respond to a less voltage than the switch to which the coil 12, is applied. If the pole changer at the start is in the proper position, it is obvious that no effect will be produced by the current flowing in coil L, excepting in the way of maintaining the switch in that position. If, however, the pole changer is required to change its position, then the action will be to reverse the position of the switch thus reversing the current connections so that the current flowing from the dynamo armature to the circuit 2, will be in proper direction. This will result in a momentary reversal of the current which began to flow in coil 12, but as the switch in the main circuit has not yet changed its position, owing to insufficient voltage, no harmful action will result. When, however, the armature has attained the desired speed, then the switch will operate and close the circuit at 15, the current now flowing in proper direction over such circuit from the armature. If at any time the armature should reverse its rotation, the current reverser C, will reverse its position owing to the action of the reversed current in coil L, so that now, although the direction of current delivered from the armature A, to the circuit 3, may be reversed, the current will nevertheless flow over the circuit 2 in the original direction. As the coil T, is placed in the portion of the circuits governed by the current reverser C, it is obvious that the said coil will still exercise its effect of opposing the magnetism developed by the coil in the circuit 4.

From the foregoing description it will be obvious that under some conditions of use, the constantly polarized element of the polarized controller shown might be the coil L, and the element in which the current changes to reverse the action might be the coil or coils P, P', while under other conditions the current will reverse in magnet L and remain constant in direction in magnets P, P'.

While I have described the polarization as effected by means of an electric coil, it will be obvious to electricians that it might be secured in other ways, as well understood in the art, and also that the construction might be varied largely without departing from my invention.

In the application of my invention to car lighting, the dynamo is constructed so that the brushes of the commutator of the armature shall have a zero lead and no readjustment of the same be required when the dynamo armature reverses its direction of revolution through the reversal in the direction of travel of the car. By using a dynamo of this kind it is obvious that the armature may remain positively coupled to the car axle or other reversible source of power, and the use of belt shifters or other mechanical devices to cause the armature to always revolve in the same direction may be avoided. The reversing switch, having a controlling magnet properly coupled to the circuits of the armature so as to reverse the connections thereof with a storage battery, takes the place of any mechanical reversing mechanism and by automatically changing the position of the switch with every change in the direction of rotation of the dynamo armature shaft causes the electric current from the dynamo to always pass in the same direction through the storage battery. It will be obvious that this combination of devices is applicable to any case where the source of power reverses its direction of rotation.

What I claim as my invention is—

1. The combination, substantially as described, of a source of electricity, a pole changing or current reversing lever governing the direction of the flow of current from said source over a working circuit, an electro-magnet mounted thereon, and a pair of electro-magnets between which the same plays, said magnets having coils connected respectively to the circuit between the armature and pole changer and to the circuit outside the pole changer.

2. The combination, substantially as described, of a dynamo armature, a storage battery, a current reverser in the connection between the armature and the battery, and a polarized electro-magnetic controller responsive to changes in the direction of the current of the armature when the rotation of the latter is reversed, and a field magnet separately excited from any source as soon as current begins to flow in the said controller.

3. The combination, substantially as described, of a dynamo machine, an opposing coil tending to cut down the voltage of the machine when the speed of the armature rises, a pole changer between said coil and the armature of the machine, and a polarized electro-magnetic controller governing the position of said reverser and responsive to changes in the direction of rotation of the armature.

4. The combination of a dynamo having a zero lead for its commutator, a storage battery charged thereby, a reversible driving power, an electro-magnetic switch controlling the connection of the armature and battery and responsive to a predetermined rise in voltage, and an electro-magnetic pole changing switch between the battery and armature responsive to change in the direction of the armature current on reversal of direction of driving.

5. The combination, substantially as described, of a storage battery, a dynamo armature, a pole changer or reverser between the battery and armature, and an actuating or controlling magnet for said reverser having one coil connected directly to the armature between said armature and reverser so as to carry a current whose direction depends upon the direction of rotation of the armature, and another or polarizing coil connected to the circuit between the pole changer and the battery.

6. The combination, substantially as described, of a dynamo, a storage battery, a field magnet coil in a connection taken from the circuit of the dynamo and battery, a current reverser, and an electro-magnetic controller for the latter having coils connected respectively into the circuit of the field magnet coil and directly to the armature.

7. The combination, substantially as described, of a dynamo, a storage battery, an electro-magnetic switch for controlling the connection of the battery and armature and adjusted to respond when the armature attains a predetermined voltage, a current reverser between the armature and battery, and a polarized electro-magnetic controller therefor responsive to changes in the direction of current delivered from the armature and adjusted to operate at a voltage less than that required for operating the first named switch.

8. The combination, substantially as described, of a separately excited dynamo electric machine and an electro-magnetic pole changer controlling the connection thereof with an exterior or working circuit and responsive to changes in the direction of the current supplied by the armature of said machine.

9. The combination, substantially as described, with a dynamo armature having a zero lead for its commutator brushes, and driven from a reversible source of motion, a storage battery charged by said dynamo, and an automatic magnetically controlled reversing switch interposed between the dynamo and battery, as and for the purpose described.

10. The combination, substantially as described, of a dynamo driven from a reversible source of motion, an opposing field magnet coil connected to the armature, a commutator for said dynamo having a zero lead for its brushes, a pole changer between said opposing field magnet coil and the armature, and a polarized controlling magnet for said pole changer, as and for the purpose described.

Signed at New York, in the county of New York and State of New York, this 7th day of October, A. D. 1893.

ISAAC N. LEWIS.

Witnesses:
WM. H. CAPEL,
THOS. F. CONREY.